United States Patent
Degbotse et al.

(10) Patent No.: US 7,734,365 B2
(45) Date of Patent: Jun. 8, 2010

(54) SUPPLY CONSUMPTION OPTIMIZATION AND MULTIPLE COMPONENT UTILIZATION

(75) Inventors: Alfred T. Degbotse, Colchester, VT (US); Robert J. Milne, Jericho, VT (US); Robert A. Orzell, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/468,203

(22) Filed: May 19, 2009

(65) Prior Publication Data

US 2009/0222312 A1 Sep. 3, 2009

Related U.S. Application Data

(62) Division of application No. 11/278,819, filed on Apr. 6, 2006, now Pat. No. 7,590,463.

(51) Int. Cl.
*G06F 19/00* (2006.01)

(52) U.S. Cl. ............................ 700/97; 700/99; 700/101; 700/106; 705/28

(58) Field of Classification Search ............. 700/95–97, 700/99–104, 106–108; 705/28, 29
See application file for complete search history.

(56) References Cited

U.S. PATENT DOCUMENTS

| | | | |
|---|---|---|---|
| 5,216,612 A | | 6/1993 | Cornett et al. |
| 5,233,533 A | * | 8/1993 | Edstrom et al. ............. 700/103 |
| 5,548,518 A | | 8/1996 | Dietrich et al. |
| 5,699,259 A | | 12/1997 | Colman et al. |
| 5,751,580 A | | 5/1998 | Chi |
| 5,787,000 A | | 7/1998 | Lilly et al. |
| 5,818,716 A | | 10/1998 | Chin et al. |
| 5,971,585 A | | 10/1999 | Dangat et al. |
| 6,088,626 A | | 7/2000 | Lilly et al. |
| 6,272,389 B1 | | 8/2001 | Dietrich |
| 6,434,443 B1 | | 8/2002 | Lin |
| 6,584,370 B2 | | 6/2003 | Denton et al. |
| 6,701,201 B2 | | 3/2004 | Hegde et al. |
| 6,731,999 B1 | | 5/2004 | Yang et al. |
| 7,058,587 B1 | | 6/2006 | Horne |
| 7,197,469 B2 | | 3/2007 | Hegde et al. |
| 7,286,889 B1 | | 10/2007 | Orzell et al. |
| 7,292,904 B2 | | 11/2007 | Denton et al. |
| 7,308,330 B2 | | 12/2007 | Jones |

(Continued)

*Primary Examiner*—Sean P Shechtman
(74) *Attorney, Agent, or Firm*—Gibb I.P. Law Firm, LLC; Richard M. Kotulak, Esq.

(57) ABSTRACT

The invention disclosed here is a method for achieving simultaneous consideration of multiple independent dates associated with a single demand. The method iterates through the demands to match the demands with the supply quantities respecting demand priorities which vary over time and demand quantities which may perish over time. One embodiment of the invention allocates demand to supply through an iterative process beginning with earlier demand requirement dates and concluding with later demands which may preempt supply from earlier demands depending upon their relative priorities. An additional embodiment transforms the demands to create multiple demand records, each having an associated priority, such that a single original demand record is transformed into a plurality of related demand records, each having an associated priority. The component supply quantities are accumulated into period ending inventories. The method matches the multiple demand records (in priority sequence) to the period ending inventories.

12 Claims, 6 Drawing Sheets

U.S. PATENT DOCUMENTS

| | | |
|---|---|---|
| 7,356,376 B1 | 4/2008 | Aboujaoude et al. |
| 7,379,781 B2 | 5/2008 | Treichler et al. |
| 7,385,529 B2 | 6/2008 | Hersh et al. |
| 2002/0198757 A1 | 12/2002 | Hedge et al. |
| 2003/0149631 A1 | 8/2003 | Crampton et al. |
| 2004/0186605 A1 | 9/2004 | Wu et al. |
| 2005/0096771 A1 | 5/2005 | Denton et al. |
| 2005/0171625 A1 | 8/2005 | Denton et al. |
| 2005/0171786 A1 | 8/2005 | Denton et al. |
| 2005/0171824 A1 | 8/2005 | Denton et al. |
| 2005/0171828 A1 | 8/2005 | Denton et al. |
| 2005/0177465 A1 | 8/2005 | Orzell et al. |
| 2006/0282343 A1 | 12/2006 | Palanisamy et al. |
| 2007/0239297 A1 | 10/2007 | Degbotse et al. |
| 2007/0239304 A1 | 10/2007 | Orzell |

* cited by examiner

L1, L2 and L3 are supply locations. R1, R2 and R3 are Demand locations

SUPPLY CONSUMPTION OPTIMIZATION AND MULTIPLE COMPONENT UTILIZATION

CROSS REFERENCE TO RELATED APPLICATIONS

This application is a divisional of U.S. application Ser. No. 11/278,819 filed Apr. 6, 2006, which is related to pending U.S. Patent Publication No. 2007/0239299 A1, published Oct. 11, 2007 to Milne et al., entitled "Large Scale Supply Planning"; U.S. Patent Publication No. 2007/0239304 A1, published on Oct. 11, 2007 to Robert Orzell, entitled "A Method For Calculating A Materials Requirements Plan For Demands Containing Multiple Demand Dates and Priorities"; and U.S. Pat. No. 7,286,889 B1, patented on Oct. 23, 2007 to Orzell and Patil, entitled, "Method For Resource Allocation and Re-Grouping Recognizing Competing Priorities Which Vary By Date". The foregoing applications are assigned to the present assignee, and are all incorporated herein by reference.

BACKGROUND OF THE INVENTION

1. Field of the Invention

The present invention relates to computer implementable decision support systems for determining optimal supply chain plans based on multiple due date considerations. General methodologies within this field of study include advanced planning systems, optimization and heuristic based algorithms, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers' demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming or heuristic algorithms.

The below-referenced U.S. patents disclose embodiments that were satisfactory for the purposes for which they were intended. The disclosures of both the below-referenced prior U.S. patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 6,701,201, "Decomposition System and Method for Solving a Large-Scale Semiconductor Production Planning Problem," Mar. 2, 2004; U.S. Patent Application 20050171824US1, "Method for simultaneously considering customer commit dates and customer request dates," Aug. 4, 2005; and U.S. Patent Application 20020198757US1, "Method for allocating limited component supply and capacity to optimize production scheduling," Dec. 26, 2002.

SUMMARY OF INVENTION

The invention uses a speedy heuristic to best associate a set of a given single consumable item, each member having a planned available date and value against competing consumers of the consumable governed by a prioritization process where individual consuming requests have priorities and/or quantities which change as a function of consumption date. The method finds a solution through iterative processing to optimally allocate supply against demands which can have multiple dates with different priorities associated with these dates. The solution is optimal as after the method is completed it is not possible to find a pair of demands whose calculated matching supplies can be switched to better conform to the dated demand priorities.

The invention can be applied to consumables of any type provided the consumable is bankable (that is if the consumable is unused on a certain date it can be used at a future date) or the consumable is used in a process where it is always used immediately when it becomes available (e.g., a situation where supply is being rationed).

One embodiment presented below comprises a method of optimizing supply consumption. This embodiment begins by receiving projected supply quantities of an item. The supply quantities can change over time as delivery times and schedules vary. The method also receives and sorts demands on the item. The demands have priorities such that at least one of the demands has multiple requirement dates for the item, and for each of the demands, earlier requirement dates of the multiple requirement dates have a different priority than later requirement dates of the multiple requirement dates.

The method iterates through the demands to match the demands with the supply quantities, wherein during the iterating the method allocates the supply quantities to an earliest requirement date of a currently iterated demand. If a supply quantity cannot be found to satisfy the earliest requirement date for the currently iterated demand, the method compares a priority of the earliest requirement date for the currently iterated demand with priorities of previously allocated earliest requirement dates of previously iterated demands. If a priority of the earliest requirement date for the currently iterated demand exceeds a priority of a previously allocated earliest requirement date of a previously iterated demand, the method reallocates (preemptively) the supply quantities from the previously allocated earliest requirement date to the currently iterated earliest requirement date and reiterates the previously iterated demand. This iteration process is repeated for each of the demands and for later requirement dates such that no demand having a lower priority earlier requirement date is satisfied until all demands having higher priority earlier requirement dates are satisfied, and such that no demand having a lower priority earlier requirement date is satisfied unless all demands having higher priority later requirement date are satisfied.

Thus, this method allocates the supply to the demands according to the priorities such that no demand having a lower priority earlier requirement date is satisfied until all demands having higher priority earlier requirement dates are satisfied, and such that no demand having a lower priority earlier requirement date is satisfied until all demands having higher priority later requirement date are satisfied.

The multiple requirement dates of a given demand each represent a full quantity of the given demand and are redundant requirements for the given demand. Thus, to avoid duplicate supply allocation to the same demand, the process of allocating the supply only allocates one of the multiple requirement dates for each of the demands. In one example, the earlier requirement dates correspond to customer request dates and the later requirement dates correspond to supplier commit dates. Supply comprises a non-perishable item that can be saved for future use.

In an additional embodiment, the method of allocating supplies among competing demands provides projected supply quantities of a supply and provides demands on the supply. This embodiment transforms the demands to create multiple demand records, each having an associated priority, such that a single original demand record is transformed into a plurality of related demand records, each having an associated priority. The supply quantities are accumulated into period ending inventories based on raw component supply records. The method matches the multiple demand records to the period ending inventories.

More specifically, the matching process includes inputting an active demand of the multiple demand records and determining component information for the active demand using a bill of materials. The matching process attempts to satisfy the active demand from the period ending inventories. If the active demand is fully satisfied, the method removes all later related demand records associated with the active demand that have a later demand date than the active demand. If the active demand is only partially satisfied, the method continues attempting to satisfy the active demand. If the active demand is not satisfied, the method removes all related demand records associated with the active demand that have an earlier demand date than the active demand, and updates a present demand date of the active demand to a next demand date. If the present demand date cannot be updated, the method deletes the active demand and processes the next demand record as the active demand.

DETAILED DESCRIPTION

Figure 1:
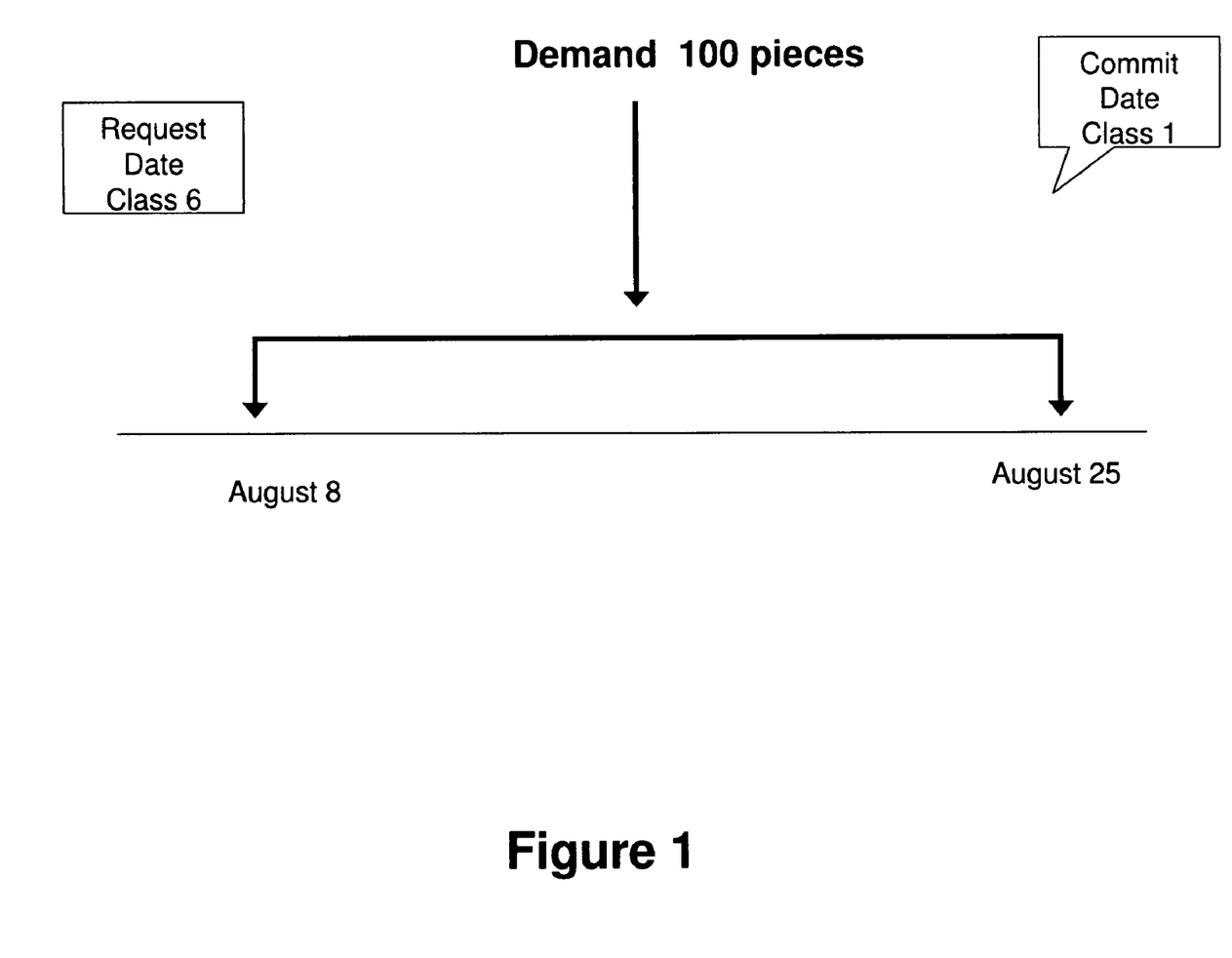
FIG. 1 is a schematic diagram showing an example of a demand with a request date and a commit date.

Supply chain planning involves the allocation of limited resources such as material inventories and capacities to best satisfy a prioritized demand statement. Competing needs for resources can be prioritized. However, the business priorities associated with a need can change as a function of when the need is satisfied. For example, FIG. 1 illustrates a demand for 100 pieces which has a requested delivery date of August $8^{th}$ and a committed delivery date of August $25^{th}$. In this example, previously the business committed to deliver the 100 pieces to the customer by August $25^{th}$ and presently the customer is requesting the pieces be delivered by August $8^{th}$. Because it is more important for the business to honor its previous commitment, the demand's commit date is assigned a more important priority (demand class 1) than the demand's request date (demand class 6). In general, a need may not be particularly important at the moment but may become critically important if the need is not met by a certain date (e.g., completing a project by a certain date required by government regulations). The converse is also true in that certain business needs may be critical to be satisfied by a certain date but will lose value if the date is not met (e.g., being first to market). In fact, any given need for a supply may have multiple independent dates associated with it such that supplying the need by those dates would have different value (importance) to the enterprise and hence should be associated with different priorities which either increase or decrease in importance as a function of the delivery date. The invention described solves the problem of how to allocate limited material inventories to needs (or demand) when priorities associated with the need change as a function of when the need is satisfied.

One problem solved by the invention is to match a set of multiple component supplies available over time to demands where the demand attributes such as demand priority and quantity change as a function of the delivery date satisfying the demand. A single demand may have multiple dates of importance each with its own priority. As an example, the supplier will try to fulfill a committed order on the date the customer requested which typically is an earliest date, but the supplier will try very hard to fulfill the demand by a (possibly later) date the supplier had previously promised delivery. The priority of a demand can increase when its expected delivery is later than its promised date.

In addition to a demand's priority changing as a function of its delivery date, its desired quantity may also decrease as a function of its delivery date. For instance, the demand of commodity products may perish if not fulfilled on time since the consumer may purchase the product from another supplier who will provide it when needed. This invention additionally solves the problem of how to assign supply to demands when priorities may change as a function of time and/or quantities may perish as a function of time.

Figure 4:
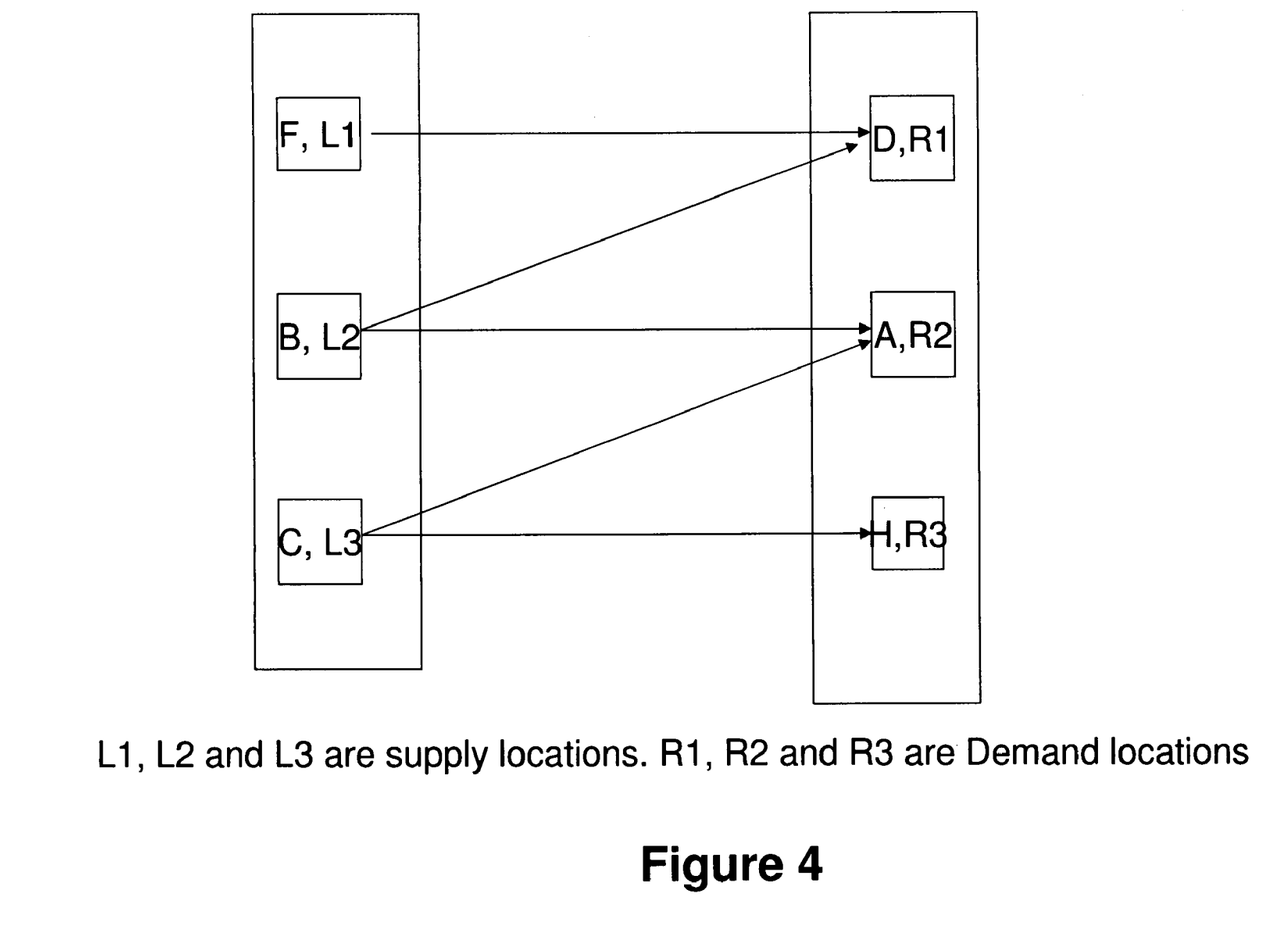
FIG. 4 is a diagram illustrating a typical supply demand relationship.

FIG. 4 shows a typical supply demand relationship. In the FIG. 4 example, supply locations L1, L2, and L3 ship product to demand locations R1, R2, and R3. In the figure, component parts F and B are shipped from locations L1 and L2 to location R1 where they are assembled to create part D. Similarly, components B and C are shipped from L2 and L3 to location R2 where they are assembled to produce part A, and part C is shipped to R3 where it is further manufactured to create part H.

This problem is a variant of the transportation problem where there are multiple supply locations (source) and multiple demand locations (sink). The general objective is to match sets of multiple components' supply from the different sources to demands at different locations in the most efficient way possible. The present invention extends the prior art by solving this problem when demand attributes change as a function of delivery date. In particular, the method illustrates how changing priorities as a function of delivery date and perishing demand quantities as a function of delivery date are handled.

Generally, the method uses the expression delivery date to refer to the time the customer receives shipment of the product. However, the invention applies as well to situations where the delivery date represents some time earlier than customer receipt of the shipment (e.g., the delivery date may indicate the time of customer receipt minus transportation time or other lead time). Similarly, while the method describes the invention according to dates, the method applies as well to any other units of time (e.g., month, week, two day period, hour, minute, second, millisecond of a day) and further that the time period increments may vary across time.

One idea behind the invention revolves around the transformation of demand records in a manner which does not lose visibility to the original demand information. For each demand record, the method creates a record for each desired delivery time (generally a date) and matches priority of the demand if not delivered on that date. For example, if the demand has two dates—a commit date and a request date—then the method would create two records: one for the commit date and the other for the request date, each with its associated demand priority. Another example of an attribute which may change as a function of the delivery date is the demand quantity. The present invention illustrates this aspect by allowing each demand to have a set of "perish quantities" over time. These are the quantities of the demand which perish (i.e., vanish) if not supplied (fulfilled) by the specified "perish dates." If the total of all perish quantities for a demand exceeds the quantity demanded, then an error message is produced and the latest perish quantities are reduced until the sum of all perish quantities equals the quantity demanded.

Another idea of the method is the transformation of supply into initial period ending inventories. The method transforms the supply by generating the cumulative sum of supply over the periods for which supply is available for each of the multiple components. This transformation of the supply is one key to resolving supply assignments for the multiple demand dates and demand class priorities. After the initial cumulative supply is calculated, it is reduced by consumption as it is allocated to demands. The resulting transformed supply gives a view of the period ending inventory under the assumption that inventories have been consumed only by those demands allocated thus far. For example, the period ending inventory at time i of a component part number would be the cumulative quantity supplied of that part number by at the end of period i reduced by its cumulative demand consumption through that period. Therefore, any demand satisfied in period i from the transformed supply could have been supplied by any of the actual supply availabilities on or before period i. Of course, when period ending inventory is used in the method to satisfy (fulfill) demand, the period ending inventory is never allowed to drop below zero at any point in time.

Figure 5:
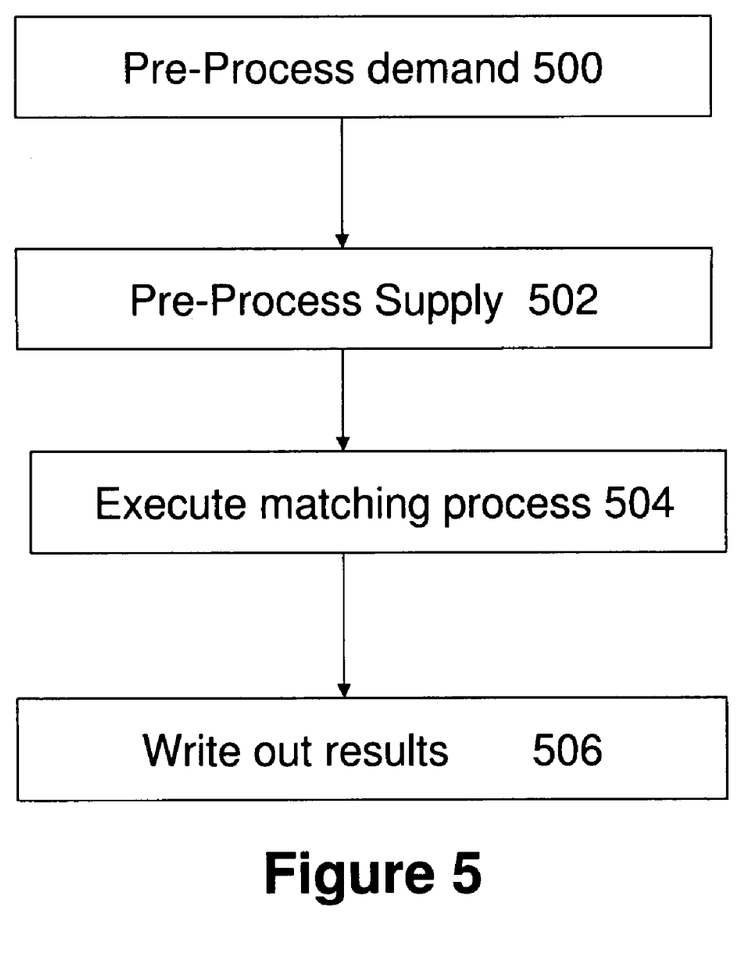
FIG. 5 is a diagram illustrating one embodiment of the invention relating to supply consumption optimization.

One Embodiment of the invention is outlined in FIG. 5. Block 500 transforms the demand creating multiple demand records for each associated priority. Block 502 creates an initial transformation of the supply by accumulating the raw component supply records into a period ending inventories under the initialization under the assumption that none of this supply has yet to be consumed. Block 504 executes the matching process which allocates the period ending inventories resulting from the component supply against the assembly demands. The demands are assigned in 504 in priority sequence. Because the demands are allocated against the projected inventories, the raw supply records contributing towards that inventory are unspecified at the time of demand allocation. This allows the underlying raw supply records to be allocated to demands implicitly at a later stage of the algorithm based on the needs of other demand priorities. For example, suppose that raw supply records of a single required item are available on March 3 (10 pieces) and March 9 (another 10 pieces) and a demand for 10 pieces with a commit date of March 17 is processed. Presuming no other demands have been processed yet, there are 20 pieces of period ending inventory available on March 17 when the committed demand requires. The method consumes 10 of those pieces of transformed supply on March 17 without specifying whether the underlying supply comes from the March 3 or March 9 raw supply. Depending upon the timing needs of subsequent demands processed, the underlying supply implicitly consumed by the March 17 demand will either be the March 3 or March 9 raw supply. By delaying this decision on raw supply allocation, the method is able to provide a better allocation (i.e., more demands fulfilled closer to their desired delivery dates) during the processing of later demands. Suppose that the demand committed for March 17 had a request date of March 4. In this case, if the priority of the request is important enough relative to the importance of competing demands, then the March 3 raw supply should be allocated to it. Conversely, if the priority of the request is not important enough relative to priorities of other demands competing for the March 3 supply, then the demand with a commit date of March 17 and request date of March 4 will get the March 9 raw supply. Because the demand commitment of March 17 is initially allocated supply from the period ending inventory, the decision on whether it is supported by the March 3 or March 9 raw supply is delayed until after less important demand priorities are considered. This approach allocates raw supply in a manner which is effective in meeting the goal of on time delivery with respect to demand priorities. Furthermore, because the demands are matched to period ending inventory in a sequential manner—without the need for reprocessing (no backtracking)—the method is fast as well as effective. The details of blocks 500, 502, and 504 are discussed further below.

Block 500 transforms the demand creating multiple demand records for each associated priority of an original demand. Each of these created records has its own target delivery date. Refer to the set of demand records created from a single original demand record as a family of demand records, and multiple records in a same family as siblings. The invention retains information on the sibling relationships throughout the processing so that when the method processes one demand record in a family, information on its siblings is readily known. For clarity of explanation, this patent application is written under the (reasonable) presumption that no records in a same family share a same target delivery date, recognizing that those skilled in the art know how to check for this condition.

There is a single set of perish quantities associated with each family. Each of these perish quantities has a date (time) at which the amount of perish quantity perishes (vanishes) if the demand is not fulfilled by that date (time). In block 500, the created demand records are assigned a quantity equal to the original demand quantity reduced by the total of all perish quantities which have perished by the date of the demand's priority. For example, if a demand for 100 pieces has priorities of 1, 2, and 3 on June 20, June 10, and June 30 respectively and perish quantities of 10 and 15 on June 15 and June 25 respectively, then the created demands would be for 100 pieces on June 10 with priority 2, 90 pieces on June 20 of priority 1, and 75 pieces of priority 3 on June 30.

After creating the demand records, block 500 then sorts the demand records according to the sequence of desired processing. In one embodiment, the demand records are sorted in sequence of priority (most important priorities first), date (earliest target delivery date first), demand part number (typically an assembly part number which is made from components), location (e.g., plant location), and (in ascending sequence) demand quantity. In the example of the preceding paragraph, presuming that lower priority numbers indicate a higher priority (e.g., priority 1 more important than priority 2), the demands would be sorted into the sequence: 90 pieces of priority 1 on June 20, 100 pieces of priority 2 on June 10, and 75 pieces of priority 3 on June 30.

Block 502 creates an initial transformation of the supply by accumulating the raw component part number supply records into a period ending inventory under the assumption that none of this supply has yet to be consumed. The raw supply includes all existing and projected supply expected to be available. This raw supply information is sorted by part number (typically a component part number), supply location, and availability date at the supply location (earliest dates first).

The raw supply is transformed into an initial period ending inventory by cumulating the supply over time under the presumption that (so far) none of the inventory has been consumed. At this point in the method, the period ending inventory resulting from the supply is known. For example, if the raw supply is 100, 100, and 50 on August 15, August 18, and August 20 respectively, then the initial period ending inventory would be 100, 200, and 250 on August 15, August 18, and August 20 respectively.

The period ending inventory is then sorted by part number, supply location, and date (in sequence of latest dates first). Continuing with the preceding paragraph's example, the period ending inventories would be sequenced as 250 on August 20, 200 on August 18, and 100 on August 15. Although this sorting sequence is not essential, it does facilitate efficient calculations further in the method.

Following the sorting of the period ending inventory, it may be convenient to create a list of unique component supply part numbers and locations. These parts are typically components of an assembly part number, but the method loses none of its applicability if the component and the assembly are the same part number. Similarly, the component supply location may or may not be at the same location as the assembly part number.

Block 504 executes the matching process which allocates the period ending inventories resulting from the component supply against the assembly demands. Recall that both the demand and period ending inventory have been sorted previously above with the demands sorted so as to have the most important demands first. The logic of block 504 is exemplified in FIG. 6. Block 600 finds the next demand from the sorted list (i.e. the most important demand to process next). This is the demand which will be allocated (component) period ending inventory by the process illustrated in FIG. 6.

Figure 6:
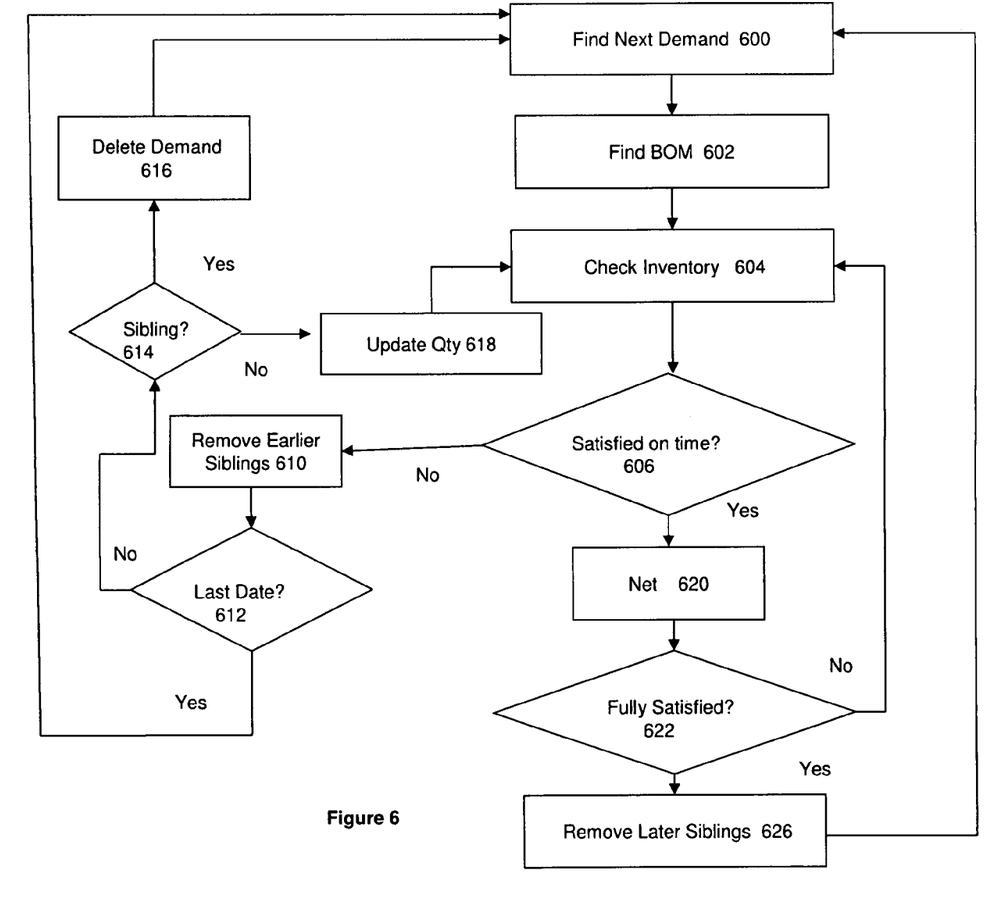
FIG. 6 is a diagram illustrating an embodiment of the invention related to the process of matching component inventories against assembly demands.

Block 602 accesses the bills of materials data to determine all component part numbers required to supply the demand's part number at the demand's location. The demand part number is typically an assembly part number but could be the same part number as a component part number. For clarity of explanation, the method will be described under the assumption that the bills of material does not change over time, recognizing that those skilled in the art will know how to adjust for this if required. Block 602 will also find all component supply locations and determine the transportation time from each component supply location to the assembly location and also the transportation cost.

Components may have a single supply location. However, when block 604 searches for available inventory of a component which has multiple supply locations, the supply location to be selected will be one which fulfills the demand on time or as close to on time as possible, accounting for any transportation time. When multiple such locations exist, the location with the lowest transportation cost will be selected. When multiple locations of a component can fulfill a demand on time (or as close to on time as possible) and have a same transportation cost, ties will be broken in favor of the location with the lowest transportation time. If ties remain, the method assigns the supply location which is able to satisfy as large a percentage of the demand quantity as possible. If further ties remain, then the method assigns the location arbitrarily. Those skilled in the art will recognize that the preferential sequencing described in this paragraph for determining the component supply location can be adjusted (re-sequenced) if warranted by the particular operating environment. As one example, avoiding partial shipments may be more important than meeting the demand on time or may even be prohibited altogether. In other environments, it will be permissible to combine partial shipments from multiple locations of a component and thus assign multiple component locations for fulfilling a particular demand. It is presumed that this is the case in the remaining discussion.

Block 604 determines the quantity of demand to be satisfied (QS) on the demand date as follows.

QS=quantity of the demand which will be satisfied by the demand on the demand date.

QD=quantity of the demand p=time period containing the demand date (time)

c=index for component part number

N=last period ending date in the horizon $TT_c$=transit time from the location where component c will be supplied to the assembly location $QTYPER_c$=bill of material quantity (quantity of component c per assembly part a released)

$I_{ct}$=period ending inventory of component c at the end of time period (date) t $AS_{cs}$=available supply of component c at the preferred component location in period s which is being tentatively reserved for a higher priority sibling of the current demand. This value of $AS_{cs}$ is calculated based on the (tentative) assumption the sibling consumes the latest supply possible which supports the sibling being fulfilled as planned during its prior processing during the method.

The quantity of demand to be satisfied (QS) on the demand date is calculated from the above information as follows.

$$QS=\text{Min}\{QD, \text{Min}_{c, t=(p-TTc) \text{ to } N}(\{I_{ct}+\Sigma_{s=1 \text{ to } t} AS_{cs}\}/QTYPER_c)\}$$

Block 606 checks to see if at least some portion of the demand was satisfied on time. If QS is zero, then block 606 passes control to block 610 and otherwise to block 620. Block 620 subtracts the satisfied demand quantity (QS) from the full demand quantity. Block 620 also subtracts from the period ending inventory of the present demand period (offset by transportation time) and from all future periods a quantity equal to the amount of QS for which the supply on that demand period—or earlier—was not previously implicitly allocated for supply to a higher priority later sibling of the demand. Furthermore, any amount of QS which had been previously implicitly allocated for supply to a higher priority later sibling at a different component location than that being used in fulfilling the demand must be added to the period ending inventory of said different component location for the period of its previously implicitly allocated supply availability and all future time periods.

If the demand quantity has not been fully satisfied, then block 622 will return control to block 604 to check additional possibilities for satisfying the demand on time (e.g., using component inventory from another location). If the demand has been fully satisfied, then block 622 will invoke block 626. Block 626 will remove records for any siblings of the demand which have a later demand date than the demand. Any such later demands will have a lower priority than the demand.

Since their higher priority, earlier sibling has been fully satisfied, there is no reason they need to be processed. This is why they may be removed from the demands to be processed. Once this has been done, block 626 will return control to block 600 which will find the next demand to process.

When block 610 has been invoked, this means that the demand has not been satisfied on its demand date. Among other things, this means that any of its siblings which have demand dates earlier in time (which must have lower priority than the demand since they were not yet processed) will not be satisfied. Consequently, all such earlier sibling demands will be removed from the demands remaining to be processed. After this has been done, block 610 will update the demand date of the demand to the next demand date. In one embodiment, this next demand date could simply be the next day in the calendar. However, in one embodiment, this next demand date will be the earliest of the following three dates: 1) the earliest date of the demand's later siblings 2) the earliest date after the present date when the demand perishes or partially perishes, and 3) the earliest time period z after the present demand date at which time the following expression becomes strictly greater than zero . . .

$$Min_c\{I_{c(z-TT_c)} + \Sigma_{s=1 \ to \ z-TT_c} AS_{cs}\}$$

Block 612 will check if the resulting next demand date is beyond the demand horizon. If so, it will not be satisfied and control will return to block 600 to process the next demand; otherwise, control is passed to block 614 which checks to see if there is a sibling demand with that next demand date. If there is such a sibling demand, then block 616 will remove (delete) the demand which has been identified as needing a next demand date since the demand's property priority and quantity will be that of its sibling which will be later processed. After this has been done, block 616 will return control to block 600 which will find the next demand to process. If block 614 does not find any such sibling demand on the next demand date, block 618 will update the demand quantity to reflect any quantity which has perished. If the perish quantity is of equal or greater magnitude as the demand quantity, then the demand will be removed and the perish quantity reduced by the demand quantity and return control to block 600. Otherwise, the demand quantity is reduced by the perish quantity and the perish quantity set to zero and return control to block 604 which will check for inventory available on the next demand date and proceed as described earlier.

A special case of the problem solved occurs when supply exists for a single item (as an example, a part number at a single location) and is allocated to a need or demand of a single item (as an example for the same part number at the same single location or a potentially different part number at a potentially different location). In this situation, an alternative embodiment of the above method may be utilized. Whether the previously described method or this alternative embodiment is used to solve this special case problem, either method may also be applied to project selection and rationing of constrained materials and services as described below in addition to demand supply network problems.

Thus, as shown above, in business, one often has to determine how to use an available supply (anything that has a value and projected availability dates) against competing needs (or demands) which consume the supply. Competing needs for a given supply can be prioritized. Often, however, business priorities associated with a need can change as a function of delivery time. In general, a need may not be important at the moment but may become critically important if the need is not met by a certain date (e.g., completing a project by a certain date required by government regulations). The converse is also true in that certain business needs may be critical to get done by a certain date but lose value if the date is not met (e.g., being first to market). In fact, any given need for a supply may in reality have multiple dates associated with it such that supplying the need by those dates would have different value to the enterprise and hence should be associated with different priorities. The embodiment described solves the problem of how to assign supply to needs (or demand) when priorities associated with the need change as a function of when the supply can be delivered.

This invention can be applied to a variety of business situations such as supply chain decision support. In supply chain business process, one often has to determine how to supply demands given available supply. Various demands can compete for the same supply and supply can be allocated to demand based on demand dates and demand priorities. Business problems exist where there is a need to supply demand given demand priority changes as a function of delivery date. As one example of this, consider an industry with considerable lead times for making their product. In such a situation, a customer may contact a supplier to obtain a commitment against a requested order. Depending on available supply, the supplier may not be able to satisfy the order when the customer requested it but will give the customer a committed supply date that is later than the customer's desired request date. As time passes, due to other order cancellations or due to improved available supply, the current available supply may be able to satisfy the order earlier than the previously committed supply date. It would be beneficial to the business to have a methodology which would supply the customer's demand closer to original desired date provided it did not impact others' commit dates. This invention can provide a solution to this business need by associating with each demand two dates, a customer request date and a customer commit date and then assigning appropriate priorities to correspond to the request date and commit date. By so doing, this invention will assign supply to demand which will attempt to satisfy lower priority customer request date but not at the expense of higher priority commit date.

The invention is also applicable to project selection. It is often the case that businesses have to make project selection choices based on need and available cash flow. In using this invention, projects (or phases of projects) could be defined as entities consuming available money. Given projected available cash as supply, potential projects with estimates of cash required could be defined with priorities which change over time. The value of a project to the business entity can often change over time. Its priority can change from "would be nice to get done early" to "critical to make by this date." This is often the case for projects performed to meet regulatory requirements and for projects with predetermined commitment dates. Projects can also change from an "important to make by date" priority to an "opportunity passed" priority wherein a project is of value if it can beat a competitor by completing by a given date but of less value if it the date is past. This invention can be applied to best utilize predicted cash flow to best select projects which will consume the available cash supporting a decision process where projects have priorities which change over time.

The invention is applicable to rationing of constrained services or physical supplies. The invention can be used in any situation where rationing is required. That is, in any situation where available services or supplies are less than required to meet all consumers of the service or supply, this invention will best supply consumers of the service or supply, supporting a prioritization process where individual consuming requests have priorities which change as a function of consumption date. Plentiful examples exist of where this invention would have value. For one example, take environments where demand for health care specialist time is in such demand that their time must be rationed. Consumers of this service (i.e. patients requiring a health care specialist) may be serviced reflecting priorities for the service that differ as a function of time. For example, some diseases progress, meaning it is desirable that treatment starts soon but after some projected time treatment becomes critical. As such, this invention could be applied best rationing the health care specialist's time against multiple patients whose priority of treatment may vary over time.

The invention is useful with input preparation of creating demand records with multiple dates and associated priorities. The invention can also be used to handle the following business situation. An enterprise may create a set of demands for purchased parts based on its NEEDS and a separate set of demands based on its WANTS. For instance, perhaps the NEEDS file contains end-item demand reflective of the purchaser's commitments and conservative forecasts while its WANTS file reflects end-item demand using optimistic forecasts with "stretch goals." Using these two files (NEEDS and WANTS) the invention may be used to create a single output file wherein each record contains both a NEED date and WANT date. The invention may be applied to this situation by treating the NEEDS as a supply record (containing part# and demand location) and the WANTS as a demand record. The supply availability date of a match record produced by the method will correspond to the NEED date while the demand date of the match record produced by the method will correspond to the WANT date. The resulting single record of "demand" output could then be used by the supplier who would apply the logic disclosed in these jointly filed CRD inventions. Unmatched NEEDS (or WANTS) would correspond to NEEDS (or WANTS) dates arbitrarily far in the future.

One function of the invention is to matching demands with available supply. This aspect of the invention finds the best matches of supply where demand priority and/or quantity changes as a function of delivery date. This describes a methodology for doing so where a demand has multiple dates associated with it, each date with different associated priorities and/or perishing quantities.

The general idea is to iterate through the demands attempting to match demands with supply. Attempts will be made to satisfy the demands to a working date described in detail below. Initially the working date will be set to the earliest date of the multiple dates associated with the demand. If a supply cannot be found to satisfy a given demand's working date, the method will attempt to find supply that had been previously allocated to a lesser priority demand. If such supply can be found, the method will preemptively take the best such supply to cover the more important demand and leave the demand whose supply has been taken to be resolved in another iteration. The algorithm will do this while being cognizant that the priorities and/or quantities of the demands will change dependent on when the demand can be supplied (satisfied). In such a manner, in the case where priorities vary with time yet quantity is constant, the method will converge to an optimal solution such that it is not possible to find a pair of demands whose calculated matching supplies can be switched to better conform to the dated demand priorities. The solution will be good, but not necessarily optimal, where quantity varies with time for those situations where competing demands of equal priority have different rates of perishing (e.g., if one demand perishes abruptly and another of the same priority perishes gradually).

Figure 2:
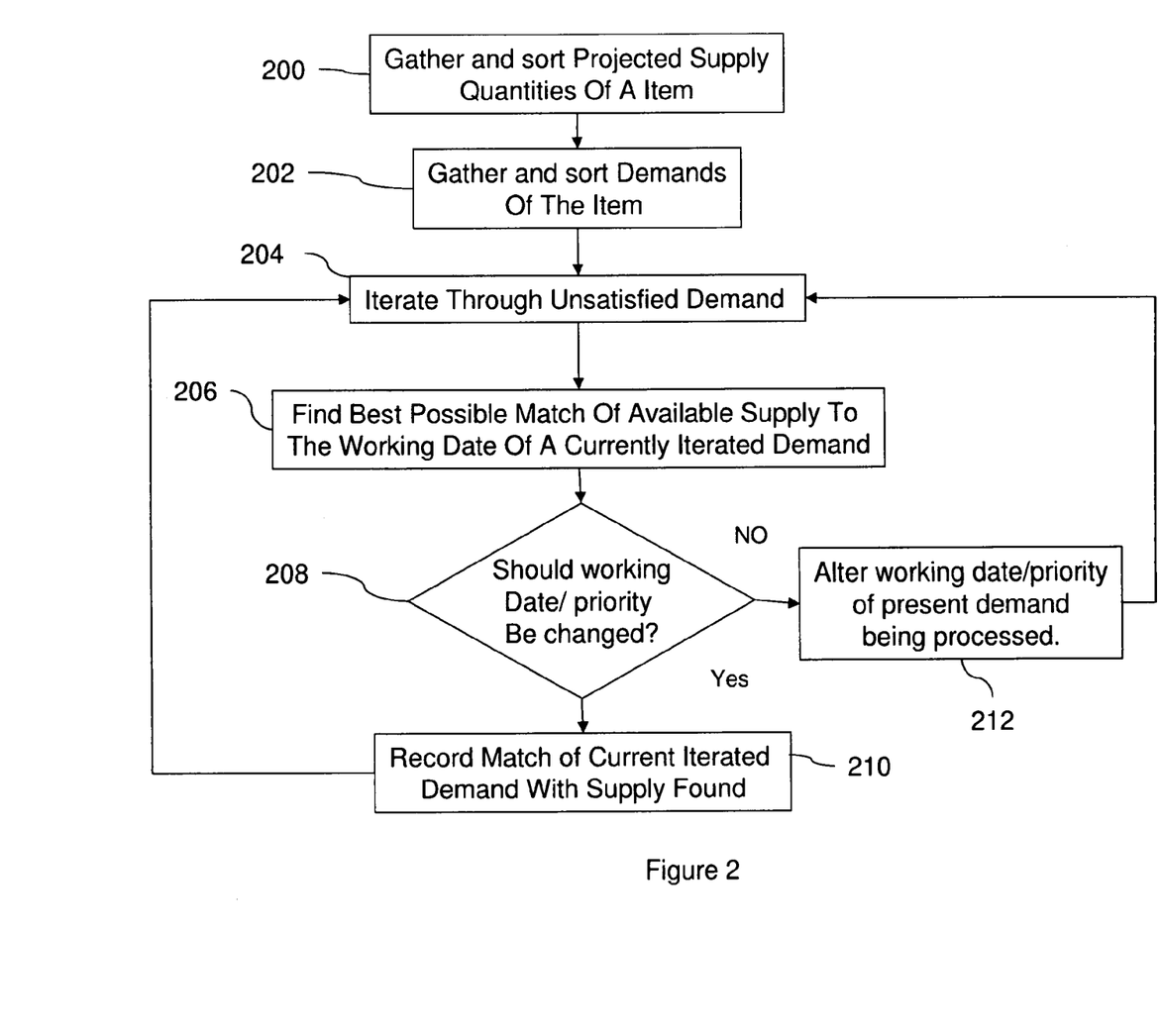
FIG. 2 is a flow diagram illustrating one embodiment of the invention relating to supply consumption optimization.

FIG. 2 illustrates such a method of optimizing supply consumption. This embodiment begins by receiving projected supply quantities of an item in block 200. The supply quantities can change over time as delivery times and schedules vary. The method also receives and sorts demands for the item in block 202. A demand may or may not have multiple dates each with an associated priority. A demand may or may not have quantities which perish over time. The demands are sorted in working date first order. As explained earlier, initially the working date of a demand is the earliest date associated with the demand.

In block 204, the method iterates through the demands to match the demands with the supply quantities. At each point in the iteration, the method finds the best possible supply against the current demand being processed in item 206. During this process, supply previously assigned to demands during an iteration of the method may be preemptively reallocated to satisfy current demand depending on the priority of the current demand. The method thus ensures lower priority demands will not take available supply at the expense of higher priority demands. Details of this step of the method will be described below and are further illustrated in FIG. 3.

A best possible supply against the current demand will have been returned at this point by the method of block 206. Two cases are possible and a condition is tested as indicated in block 208. If the supply date returned is for a date that is earlier than the next date associated with a priority/quantity change for the demand, the supply is booked as supply against the demand in block 210. The supply quantities and demand quantities are appropriately decremented then processing returns to block 204 for the next iteration of the algorithm. Otherwise, the date of supply is applicable to a time where the priority or quantity of the demand differs from the present working date of the demand. Therefore, the supply is not matched with the demand at this time. Instead, the working date of the present demand is changed to the next date associated with the demand along with its corresponding priorities and quantity. This altered demand is then returned to the block 204 for processing through another iteration of the method.

Thus, this method allocates the supply to the demands according to the priorities such that no demand having a lower priority earlier requirement date is satisfied until all demands having higher priority earlier requirement dates are satisfied, and such that no demand having a lower priority earlier requirement date is satisfied until all demands having higher priority later requirement dates are satisfied.

More specifically, in item 200, the invention obtains current and projected supply available for a given item or service. This can be the projected supply of a manufacturing asset at a given manufacturing plant or warehouse or it can be a service. Projected supply is sorted in supply date order (from earliest to latest). Additionally, dummy supply records are added with a huge quantity and a date far in the future to the input records. This is done to allow the method to proceed optimally in the case when there is more total demand than supply. Any demands that are ultimately associated with such dummy supply records by the invention are considered never satisfied with supply. This allows the method to continue to attempt to find the best match of supply versus demand even if all supply has been consumed.

As mentioned above, in item 202, the invention obtains demands which need to consume supply from the given supply of the item or service obtained from 200 above. Each of these demands may contain multiple dates and associated priorities. Optionally, each demand may have a set of "perish quantities" over time. These are the quantities of the demand which perish (i.e. vanish) if not delivered by the specified "perish dates." If the sum of all perish quantities for a demand exceeds the total quantity demanded, then an error message is produced and the latest perish quantities are reduced until the sum of all perish quantities equals the quantity demanded.

In addition, the demands are sorted in item 202. For each individual demand, if a demand has "n" dates each associated with its own priority, the dates and associated priorities are ordered in date sequence from earliest to latest. A working date is associated with each demand corresponding initially to the earliest date associated with a demand. In addition, in item 202 the invention creates a working date and associated priority for each demand. Initially, the working date is set to the earliest date associated with a demand and the working priority is set to the priority associated with this date. Finally in 202, the demands are sorted from earliest to latest working date.

As shown in items 204-212, the invention iterates through the demands (starting with the working date) matching supply against demands and creates a "match table" which will associate given supply assets with given demands. In item 204, the invention keeps iterating as long as there are demands which have not yet been matched with a supply and there are still non-zero asset supplies available.

Figure 3:
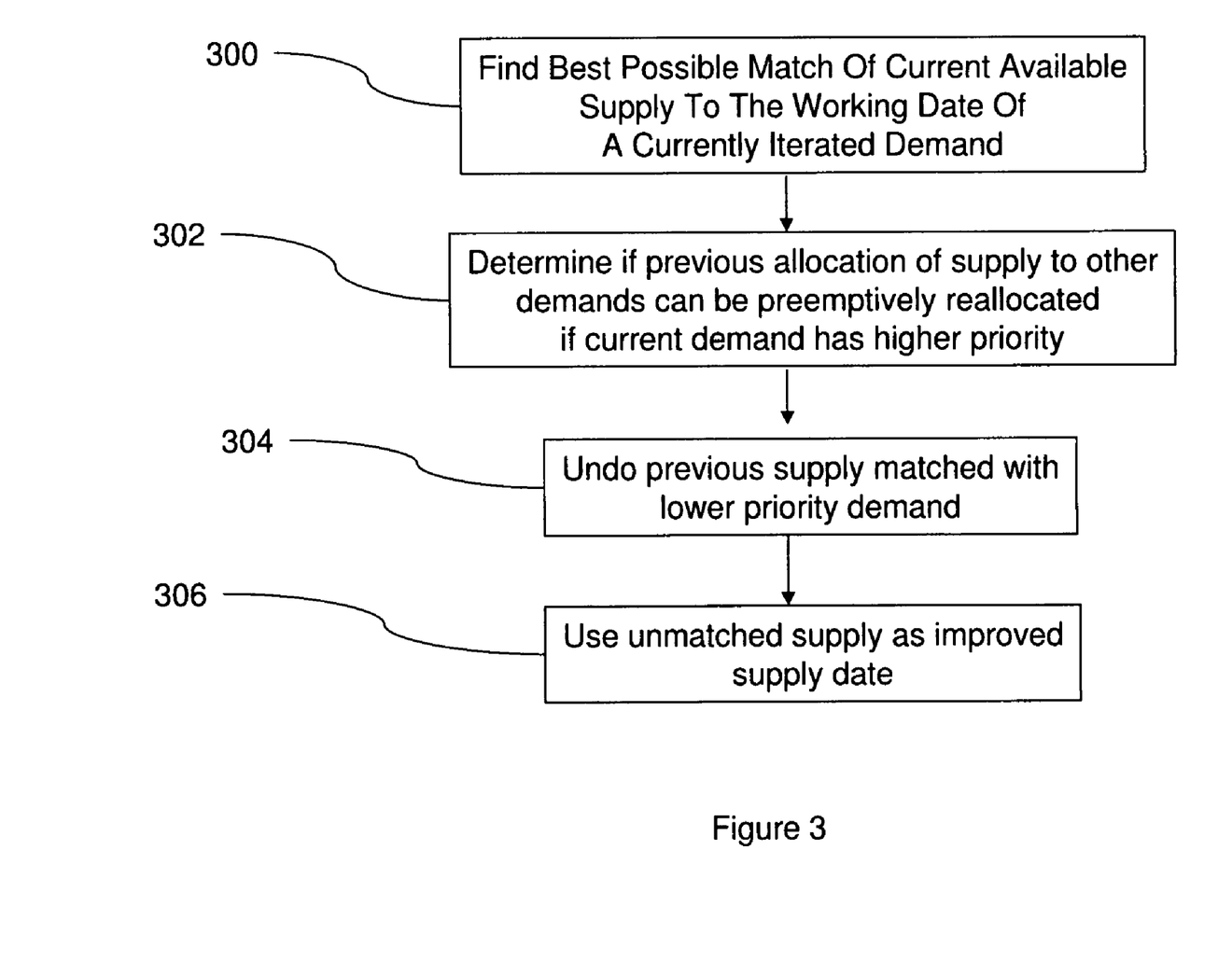
FIG. 3 is a diagram further illustrating the details of a block in FIG. 2.

During the iteration, in item 206 the invention finds the best possible supply with which to associate with the current demand/working date being processed. The details of this step are illustrated in FIG. 3 which will be described below.

Depending on the supply date that is returned by block 206, the method will follow two differing paths. A test is done by block 208 of the method to determine whether the present supply can be associated with the demand or whether instead it will be necessary to change the working date and associated priority of the demand for subsequent iteration of the method. If the date of the supply is less than or equal to the working date of the demand, the method proceeds to block 210 to associate the supply with the demand.

Otherwise, in the processing of block 208, the invention defines the "next effective demand date" as the next date associated with a given demand that is greater than the current working date. If the current date of the supply available to the demand is less than the next effective demand date or if there is no next effective demand date, the demand will be supplied late but this is the best that can be done and no further processing of this demand will be necessary. In this case, the invention proceeds to block 210 to associate the supply with the demand. If the current date of the supply available to the demand is greater than the next effective demand date, the current available supply will be available to cover a demand but at a date where the demand will have different priority. Therefore, to ensure supply is allocated with correct priority in such a case, the method will not at this time perform block 210 to assign supply to the demand. Instead, the invention will change the working date, priority, and potentially quantity associated with this demand to reflect the priorities and quantity of the demand being satisfied by next effective demand date by performing the method of block 212.

In block 210, the method records and saves a matching of supply to the currently iterated demand. A table entry is created in a "match table" which associates the quantity of a supply asset used to satisfy (fulfill) a same quantity of the particular demand. This same quantity is called the match table quantity. The supply available and demand needed to be supplied is netted by this process. More specifically, the invention nets the demand by creating an entry matching the supply with the demand in the "match table". This table holds information identifying each demand and each asset which is planned to be used to satisfy the demand. In addition to the keeping all the dates and associated priorities associated with a demand, this table also carries the specific demand working date and the associated priority that was used when the supply demand match was made.

If the supply of the asset is less than or equal to the amount of the demand, the invention sets the match table quantity to the asset supply quantity. Then, the invention nets the supply from the demand (described in block 202) by subtracting out the asset supply from the demand quantity and making the supply of the asset zero (described in block 200). To the contrary, if the supply of the asset is greater than the amount of the demand, the invention sets the match table quantity to the demand quantity. Then, the invention nets the demand from the supply (described in block 200) by subtracting the demand quantity from the asset supply available and making the demand quantity zero (described in block 202). By this process, some of both supply and demand used by the iteration of block 204 is consumed.

In block 212, the method will set the working date of the currently iterated demand to the next effective demand date and set priorities of the demand to the priorities associated with the next effective demand date. The invention at this point checks to see if there is a perish quantity corresponding to this demand when moving its working date to the next effective demand date. If no such perish quantity is found, the method returns to item 204 to be processed by the method, this time considering the new working date and priority. If the perish quantity is less than the demand quantity, then the invention reduces the demand quantity by the perish quantity and changes the perish quantity on that next effective demand date (for use in future iterations) to zero; otherwise, the invention eliminates this demand record (it has completely perished), reduces the perish quantity on that next effective demand date by the demand quantity, and repeats the next iteration without this demand record. After updating the working date of the demand and potentially its priority and/or quantity, the method proceeds to the next iteration at the beginning of item 204.

FIG. 3 illustrates in more detail the method of block 206 of FIG. 2, wherein in block 300, remaining supply is first examined in attempting to satisfy the current working date of the currently iterated demand. If a supply quantity cannot be found to satisfy the working date for the currently iterated demand on time, block 302 of the method determines if supply allocated to demand in a previous iteration of the method should be reallocated and used to cover the needs of the present iterated demand. Thus in step 302, the method compares the priority of the working date for the currently iterated demand with priorities of previously iterated demands which have been supplied. If a priority of the working date for the currently iterated demand exceeds a priority of a previously allocated working date of a previously iterated demand, the method reallocates (preemptively) the supply quantities from the previously allocated demand to the currently iterated demand in item 304. The reallocated supply providing an improved supply date is made available in item 306 providing block 208 with an improved supply date for its processing.

More specifically, in block 300, the invention finds the earliest unconsumed asset that can be used to supply (i.e., fulfill) the demand. An asset is unconsumed if it has quantity that has not yet been associated with a demand by some iteration of the method of block 210. If the supply date of the asset so found is less than or equal to the working date of the currently iterated demand, this step of the invention returns the supply to be used by the method of block 208 of FIG. 2. Otherwise, the method proceeds to block 302.

In block 302, the method determines if previous allocation of supply to other demands can be preemptively reallocated if current demand has higher priority. To find previously allocated supply which can be preemptively given to the current iterated demand, the invention goes through the existing match table with current entries of supply matched to demand and to find, if it exists, a lesser priority demand which has been previously covered by a supply asset whose supply can be taken to be applied against the higher priority demand represented by the current demand. The invention goes through each entry in the "match table" containing the association of specific assets supplying specific demands. The method searches for entries where the supply date of the corresponding match table entry is less than or equal to the working date of the current iterated demand and the priority of the demand being covered by this match table entry is of lesser priority than the priority associated with the current iterated demand. If such an entry is found and if this is the first time such a match table entry has been found in this search, the invention saves a pointer to this match table entry. If this is not the first time such a match table entry has been found in this search, the invention saves a pointer to this match table entry only if the supply date associated with the match table entry is greater than the previous one saved or the supply date associated with the match table entry is equal to the one previously saved and this match table entry is associated with a demand of lesser priority than the previous one that was saved.

If no pointer to a match table entry has been found by the above search, no improved supply date to the current iterated demand is possible and the method returns the existing supply to be used in block 208 of FIG. 2. That is, the supply found in block 300 is the best available and is returned. Otherwise, in block 306, the method will undo the match table entry which identifies the asset being associated with the lesser priority demand. In this undo process, it will make the match table quantity available again to available supply and similarly will recreate the lesser priority demand as a demand having that match table quantity that will later have to again have supply associated with it by iteration through block 204. More specifically, in this process, the invention undoes the match table entry that is pointed to by creating a demand record in the input of block 202 with the quantity pointed to in the match table with the same dates and priorities of the demand that was originally associated with this entry, creates a supply record in the input of block 200 with the quantity in the match table with the same supply date as the asset that was previously associated with this entry, and deletes the match table entry. If block 304 was executed, block 306 passes a pointer to the supply record found with the improved supply date which is then used by block 208 of the method as its supply.

Further, while embodiments herein discuss priorities and perishability, one ordinarily skilled in the art would understand that the invention is broadly applicable to all methods of production planning which allocates supply to demand where any form of "demand attribute" changes as a function of delivery date, and the priorities and perishing quantities discussed herein are simply two examples of a demand attribute changing. Therefore, the embodiments herein are applicable to all demand attributes and not just to priorities and perishing quantities.

An embodiment of the present invention has been programmed in C++ and implemented on an IBM P690 server with AFS for data storage and using the AIX operating system. It has also been implemented on HP-UX. It should be understood by those of ordinary skill in the art, however, that the present invention is not limited to the above implementation and is independent of the computer/system architecture. Accordingly, the present invention may equally be implemented on other computing platforms, programming languages, and operating systems, and also may be hardwired into a circuit or other computational component.

While the invention has been described in terms of the preferred embodiments, those skilled in the art will recognize that the invention can be practiced with modification within the spirit and scope of the appended claims.

The invention claimed is:

1. A computer-implemented method of allocating supplies among competing demands comprising:
   providing projected supply quantities of a supply using a computer;
   providing demands on said supply using said computer;
   transforming said demands to create multiple demand records, each having an associated priority, such that a single original demand record is transformed into a plurality of related demand records, each having an associated priority using said computer;
   accumulating said supply quantities based on raw component supply records into period ending inventories using said computer; and
   matching said multiple demand records to said period ending inventories in a process comprising:
      inputting an active demand of said multiple demand records using a computer;
      determining component information for said active demand using a bill of materials using said computer;
      attempting to satisfy said active demand from said period ending inventories using said computer;
      if said active demand is fully satisfied, removing all later related demand records associated with said active demand that have a later demand date than said active demand using said computer;
      if said active demand is only partially satisfied, continuing attempting to satisfy said active demand using said computer; and
      if said active demand is not satisfied, removing all related demand records associated with said active demand that have an earlier demand date than said active demand, and updating a present demand date of said active demand to a next demand date using said computer;
      if said present demand date cannot be updated, deleting said active demand and processing a next demand record as said active demand using said computer.

2. The method according to claim 1, wherein said next demand date comprises one of:
   an earliest date of a related demand record of said active demand;
   an earliest date after said present demand date when demand perishes or partially perishes; and
   an earliest time period after said present demand date at which time the available period ending inventory of all demanded components becomes positive.

3. The method according to claim 1, further comprising netting said active demand from said period ending inventories.

4. The method according to claim 1, further comprising searching for inventory at multiple locations when performing said matching.

5. The method according to claim 1, wherein, during said matching, said raw component supply records are unspecified.

6. The method according to claim 1, wherein said matching allocates said period ending inventories to said multiple demand records based on said associated priorities.

7. A computer-implemented method of allocating supplies among competing demands comprising:

provewing projected supply quantities of a supply using a computer;

providing demands on said supply using said computer;

transforming said demands to create multiple demand records, each having an associated demand attribute, such that a single original demand record is transformed into a plurality of related demand records, each having an associated demand attribute using said computer;

accumulating said supply quantities based on raw component supply records into period ending inventories using said computer; and matching said multiple demand records to said period ending inventories in a process comprising:

inputting an active demand of said multiple demand records using a computer;

determining component information for said active demand using a bill of materials using said computer;

attempting to satisfy said active demand from said period ending inventories using said computer;

if said active demand is fully satisfied, removing all later related demand records associated with said active demand that have a later demand date than said active demand using said computer;

if said active demand is only partially satisfied, continuing attempting to satisfy said active demand using said computer; and if said active demand is not satisfied, removing all related demand records associated with said active demand that have an earlier demand date than said active demand, and updating a present demand date of said active demand to a next demand date using said computer;

if said present demand date cannot be updated, deleting said active demand and processing a next demand record as said active demand using said computer.

8. The method according to claim 7, wherein said next demand date comprises one of:

an earliest date of a related demand record of said active demand;

an earliest date after said present demand date when demand perishes or partially perishes; and an earliest time period after said present demand date at which time the available period ending inventory of all demanded components becomes positive.

9. The method according to claim 7, further comprising netting said active demand from said period ending inventories.

10. The method according to claim 7, further comprising searching for inventory at multiple locations when performing said matching.

11. The method according to claim 7, wherein, during said matching, said raw component supply records are unspecified.

12. The method according to claim 7, wherein said matching allocates said period ending inventories to said multiple demand records based on said associated demand attributes.

* * * * *